L. P. JENKS & F. DRAPER.
FILTERING COCK.
No. 21,964. Patented Nov. 2, 1858.
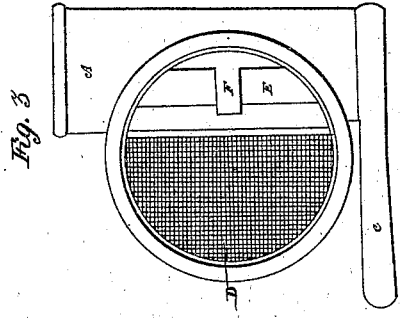
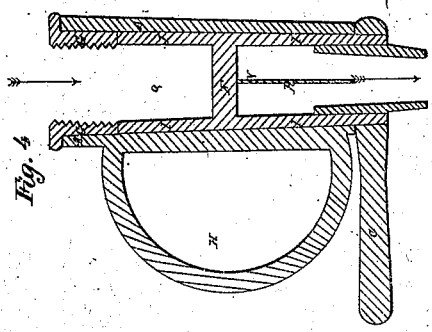
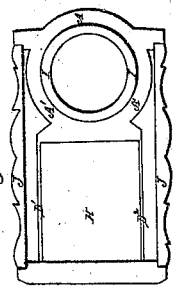
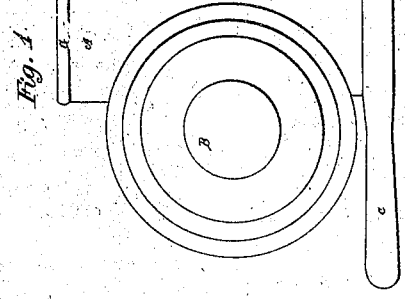
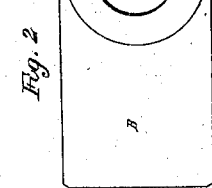
Francis Draper.
Lewis P. Jenks.

UNITED STATES PATENT OFFICE.

LEMUEL P. JENKS, OF BOSTON, AND FRANCIS DRAPER, OF EAST CAMBRIDGE, MASSACHUSETTS.

FILTERING-COCK.

Specification of Letters Patent No. 21,964, dated November 2, 1858.

*To all whom it may concern:*

Be it known that we, LEMUEL P. JENKS, of Boston, Suffolk county, and FRANCIS DRAPER, of East Cambridge, Middlesex county, Massachusetts, have invented certain new and useful Improvements in Filters, of which the following is a specification.

The nature of our invention consists in a new and useful arrangement for the filtration of water and other fluids for the purpose of purifying it from foreign substances.

We more particularly design it for the purification of water under pressure from the impurities common in aqueduct water: part however of our invention is useful for other purposes and is claimed separately in claim No. 2.

We do not claim any special substance for the part of the filter by means of whose fine cavities the fluid is cleansed. We prefer however pumice stone.

Our invention relates more particularly to a mode of freeing the capillary and other tubes of the filtrating part from accumulating impurities. The water is forced through the filter under the full pressure of the head, and when one side of the filter becomes clogged, by an easily managed contrivance, the water is directed, still under the full head of pressure, back the other way through the filter,—and so on, in alternation; the course of the current being changed as often as may be found desirable.
The arrangement permits also the passage of the water through without filtration when desired.

And in the drawings annexed, which form a part of our specification Figure 1 shows a side view of one form of our filter. Fig. 2 a view from the top. Fig. 3 is the same as Fig. 1 except that one side plate J (Fig. 5) is removed to allow a view of the interior. Fig. 4 is a perpendicular section of Fig. 1.
Fig. 5 is a horizontal section of Fig. 1. Figs. 6, 7 and 8 are horizontal sections of I, I. Figs. 4 and 5, as hereinafter explained, (the right hand circular figure in each of Figs. 6, 7 and 8, being sections of the upper part of I, I and the left hand circular figures, sections of the lower part of I, I.)

In Fig. 1, A is a hollow frustum of a cone, of block tin, britannia ware or other substance, screwing on to the hydrant by means of the female screw piece G (see G in Fig. 4) firmly fixed to A, by brazing, soldering or screwing. B, Fig. 1, is a short cylinder (whose length is seen in Fig. 2) placed with its axis horizontal to that of A which is sunk into side of B. Inside of A (see Fig. 4) is another hollow frustum of a cone I, I, fitting closely into A, its upper end sunk below that of A to allow the reception of G (above referred to) and its lower end projecting below that of A sufficiently far to permit the placing thereon of the handle C, which is fastened to it (seen in Figs. 1, 3, and 4) to effect at intervals the partial rotation of I, I. This hollow frustum of a cone I, I, has placed in and across it a plate F, Fig. 4, preventing direct communication between the upper (Q) and the under (R) cavities of I, I. The hollow frustum of a cone A has in it four longitudinal cavities at A',—A', Fig. 5, two on each side, one above the other (not shown in Fig. 5 as they do not occur at the center of A, Fig. 4, where the section is made constituting Fig. 5.)

H, Figs. 4 and 5, is the cavity (nearly hemispherical in perpendicular section) containing the filtrating substance (say, pumice stone).

D (Fig. 3, and $D^1$—$D^2$, Fig. 5) is a wire gauze, perforated plate, or haircloth (all or either of them) preventing the abstraction of the filtrating substance, and also acting itself as a filter.

The hollow conical tube I, I has several oblong perforations $\frac{1}{2}$ inch by 1 inch,—viz. 2 (M and P, Fig. 6) in the upper compartment Q, Fig. 4—and three L, O, N, Fig. 6, in the lower compartment R, Fig. 4. The division Q Fig. 4 is the induction chamber and the division R Fig. 4 is the eduction chamber. The changes of place of these apertures M and P, and L, O, N, Fig. 6, effected by the handle C (Figs. 1, 3 and 4) are shown in Figs. 6, 7 and 8,—as will be explained, and to prevent the rotatory discharge of the water, we place, vertically, a plate, V, Figs. 4, 6, 7 and 8, across the chamber R.

The operation of the contrivance is this: The filter being screwed on to the hydrant by the screw G, Fig. 4; (the plates J, J, Fig. 5, being firmly fixed on) the apparatus presents at the side view the appearance shown in Fig. 1. The hollow conical tube I, I, Fig. 4, is so placed by means of the handle C, (Figs. 1, 3 and 4) as that the aperture M of the induction chamber Q, Fig. 4 is placed as seen in Fig. 6. The aperture L of the eduction chamber R, Fig. 4, is at the same time placed as seen in Fig. 6. The water being let on by the turning of the cock (not represented) entering Q (Fig. 4) passes through M, Fig. 6, and into the space between J and $D^1$, Fig. 5. Finding no other passage it is forced through $D^1$ through the filtering cavity H, with its filtering substance, emerges at $D^2$ and passes into I, I, Fig. 4, by means of the aperture L, Fig. 6. It is then in R, Fig. 4, and is discharged in the direction of the arrow. When the reception side of the filter becomes clogged with impurities, then, by means of the handle C (Figs. 1, 3, and 4,) the aperture M, Fig. 7, of the upper division Q of I, I, Fig. 4, is (by partial rotation of I, I) placed in the position seen in Fig. 7. The aperture M (see Fig. 7) leading to R (Fig. 4) is by the same movement placed as seen in Fig. 7. The water then coming into Q (Fig. 4) enters into the passageway between $D^2$ and J, Fig. 5, and passing through the filter emerges between $D^1$ and J, goes through N, Fig. 7, in the direction indicated by the arrow, and is then in R, (Fig. 4) as before, from whence it is discharged, it having brought with it the impurities which may have accumulated on $D^1$. When $D^2$, shall have accumulated impurities, the conical tube is again partially rotated, and so on.

When it is desired simply to draw the water without filtration and without removal of the filter, by means of the handle C, the other aperture P, see Fig. 8, leading from Q (Fig. 4) is placed as seen in Fig. 8. The aperture O, as will be seen in Fig. 8 is located directly beneath it, and the water emerging from Q Fig. 4 at P (in direction of the arrow at P) passes directly through O (Fig. 8) in the direction of the arrow, without going through the filter, into R (Fig. 4) whence it is discharged as before in direction of the arrow. There are other forms in which we can make our filter and we do not limit ourselves to any particular form.

The obstruction to the passage of the water by a filter is to a certain extent unavoidable, but it is exceedingly important that this should be diminished to the lowest possible degree. The head of water in aqueducts is limited, and water cocks at a high elevation cannot be used with a filter unless the same be so constructed as to oppose but little obstacle to the passage of the water and with water cocks at a lower elevation a considerable diminution of the rapidity of the passage of the water is always an objection. Hence one great element of value in our filter.

We do not claim the reversal of the filter to change the current, nor the reversion of the vessel containing the filtrating portion of the filter, nor the purifying the filter by means of the specific gravity of a small portion of water left behind after the full current has ceased; we do not claim the alternate transmission of the water from one side to the other in filtering cocks, nor do we claim that device in combination with the optional passage of liquid through the case without passing through the filter,—nor do we claim the alternate transmission of the water by one passage across the width of the filter; but What we do claim we thus express:

We claim, the combination and arrangement of a filtering cock, substantially as described, giving the optional transmission of the water through the filtering medium in either direction, or through the filtering case, the former without unnecessary impediment to the current, by one passage across the width of the filter, from a rotating two way cock, placed by the side of the filtering medium, and closed or discharging at pleasure, the filtering case and the filtering medium being stationary.

LEML. P. JENKS.
FRANCIS DRAPER.

Witnesses:
J. H. TYLER,
BENJ. R. RAND.